US006655825B2

(12) United States Patent
Muthu et al.

(10) Patent No.: US 6,655,825 B2
(45) Date of Patent: Dec. 2, 2003

(54) WHITE LIGHT SOURCE FOR LCD BACKLIGHT

(75) Inventors: Subramanian Muthu, Ossining, NY (US); Schuurmans Frank J. P., Valkenswaard (NL); James M. Gaines, Mohegan Lake, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/034,207

(22) Filed: Dec. 28, 2001

(65) Prior Publication Data

US 2003/0123261 A1 Jul. 3, 2003

(51) Int. Cl.[7] .................................................. F21V 7/04
(52) U.S. Cl. ......................... 362/561; 362/31; 362/555
(58) Field of Search ............................... 362/561, 555, 362/31, 236, 231, 559, 320

(56) References Cited

U.S. PATENT DOCUMENTS

| | | | | |
|---|---|---|---|---|
| 5,031,078 A | * | 7/1991 | Bornhorst | 362/552 |
| 5,301,090 A | | 4/1994 | Hed | 362/32 |
| 5,613,751 A | * | 3/1997 | Parker et al. | 362/31 |
| 5,839,813 A | | 11/1998 | Smith | 36/432 |
| 5,915,855 A | | 6/1999 | Murase et al. | 40/546 |
| 5,921,652 A | | 7/1999 | Parker et al. | 362/31 |
| 6,428,198 B1 | * | 8/2002 | Saccomanno et al. | 362/559 |

FOREIGN PATENT DOCUMENTS

| | | | | |
|---|---|---|---|---|
| GB | 2291248 | | 1/1996 | G09F/19/12 |
| JP | 07311382 A | | 11/1995 | F21V/8/00 |
| JP | 09197132 A | | 7/1997 | F21V/8/00 |

* cited by examiner

Primary Examiner—Sandra O'Shea
Assistant Examiner—John Anthony Ward

(57) ABSTRACT

A white light is provided for backlighting a liquid crystal display by directing red green and blue light into the first end of a color mixing optical fiber, mixing the red green and blue light in the color mixing fiber to produce white light, and conducting the white light out of the second end of the color mixing fiber to the liquid crystal display. The color mixing optical fiber and sources for generating the red green and blue light may be located remotely from the liquid crystal display, and the white light produced in the color mixing optical fiber coupled to the liquid crystal display by coupling optical fibers, thus simplifying and facilitating construction and operation of the backlighting system, and allowing for more convenient removal of heat remotely from the liquid crystal display.

25 Claims, 2 Drawing Sheets

WHITE LIGHT SOURCE FOR LCD BACKLIGHT

TECHNICAL FIELD OF THE INVENTION

This invention relates to backlighting of a liquid crystal display (LCD), and more particularly to generating white light for LCD backlighting by mixing red green and blue (RGB) light produced by light emitting diodes (LED) to form white light, and coupling the white light to the LCD display.

BACKGROUND OF THE INVENTION

In many modern electronic devices, such as flat-screen televisions and computer monitors, the images viewed by the user are produced on a liquid crystal display (LCD). An LCD generally requires some form of backlighting for the images to be visible in normal or reduced ambient light environments. The backlighting is provided by placing a light guide structure behind the LCD panel, and illuminating one or more edges of the light guide.

In recent years, the edges of the light guide have been illuminated by red green and blue (RGB) light emitting diodes (LED)s, arranged in linear arrays and distributed along the edges of the light guide or mounted in a light distributing structure attached to an edge of the light guide. The light emitted from the RGB LED arrays is then mixed in the light guide or the distributing structure, to form white light for backlighting the LCD.

Providing white light in this manner has several drawbacks. It is often necessary to make the light guide and/or the distributing structure larger or more complex than would otherwise be required to provide sufficient "mixing distance," or to include reflective features in the light guide or distributing structure, to ensure that a white light of acceptable quality is produced. The actual color of light produced by an LED varies from one production lot of LEDs to another. The wavelength of the light produced in a given LED changes over time and as a function of operating temperature. Developing an optimal spacing and arrangement of RGB LEDs to provide acceptable white light, and dealing with the inherent variability of wavelength produced in the LEDs has required in the past that the LEDs be matched and stored according to the wavelength of light actually produced and the operating idiosyncrasies of each LED. Such constraints on matching performance significantly drive up the complexity and cost of manufacturing a backlighting system giving repetitively consistent light quality.

Another problem with prior backlighting approaches has been dealing with removal of the heat generated by the LEDs from the LCD. Incorporating effective and efficient heat sinks in close proximity to the LCD is often very difficult, without undesirably increasing the size and cost of the LCD and backlighting system. Newer generations of LEDs having higher light emitting efficiencies and operating at higher driving currents have allowed the number of LEDs in a typical array to be reduced, but the problem of heat removal still exists. Reducing the number of LEDs, and spreading them farther apart in the arrays, to facilitate incorporation of heat sinks, can make the problem of achieving proper mixing more difficult, however, than in prior backlighting approaches using a larger number of the older, less efficient LEDs spaced more closely together.

What is needed, therefore, is an improved method and apparatus for backlighting an LCD, in a manner overcoming one or more of the problems described above.

SUMMARY OF THE INVENTION

Our invention provides such an improved method and apparatus for backlighting a liquid crystal display by directing red green and blue light into the first end of a color mixing optical fiber, mixing the red green and blue light in the color mixing fiber to produce white light, and conducting the white light out of the second end of the color mixing fiber to the liquid crystal display. The color mixing optical fiber and the sources for generating the red green and blue light may be located remotely from the LCD, and the white light produced in the color mixing optical fiber coupled to the LCD by coupling optical fibers, thus simplifying and facilitating construction of the backlighting system, and allowing for more convenient removal of heat remotely from the LCD.

In one form of our invention an apparatus for backlighting a liquid crystal display includes a color mixing optical fiber for mixing red green and blue light in the color mixing fiber to produce white light, the color mixing optical fiber having a first end adapted for receiving red green and blue light and a second end adapted for delivering the white light. The apparatus also includes means for directing red green and blue light into the first end of the color mixing optical fiber, and means for conducting the white light out of the second end of the color mixing fiber to the liquid crystal display.

The means for directing the red green and blue light to the first end of the color mixing fiber may include means for generating the red green and blue light in individual light sources. The means for directing the red green and blue light to the first end of the color mixing fiber may also include means for collecting and coupling the light generated by each of the individual red green and blue light sources to the first end of the color mixing fiber as unmixed red green and blue light. The means for collecting and coupling the red green and blue light from the red green and blue light sources to the first end of the of the color mixing fiber may include in-coupling optics, and monochromatic light coupling fibers for coupling the light of the red green and blue light from the red green and blue light sources to the first end of the of the color mixing fiber as unmixed red green and blue light.

Where monochromatic light fibers are included, the monochromatic light coupling fibers each have an output end joined to the first end of the color mixing optical fiber. Where the output ends of the coupling fibers have a combined area smaller than the area of the first end of the color mixing optical fiber, the area of the first end of the color mixing optical fiber extending beyond the area of the output ends of the coupling fiber may include a mirrored surface for reflecting light back into the color mixing optical fiber.

Where multiple fibers are coupled into one fiber, a noncircular (i.e. rectangular or semi-circular) fiber cross section may provide most efficient coupling. Any internal angles in the cross section must be large enough, however, that total internal reflection occurs inside the fiber.

The apparatus may also include additional structures such as a light guide for guiding the white light through the liquid crystal display, a reflector for reflecting the white light out of the liquid crystal display, and a light distributor rod for distributing the white light into the liquid crystal display.

In some forms of our invention, the second end of the color mixing optical fiber is attached directly to the light distributor rod. In other forms of our invention, a light coupling fiber may be operably attached between the second face of the color mixing optical fiber and the light distributor rod for coupling the white light from the color mixing optical fiber to the light distributor rod. Where the coupling fiber has an input end joined to the second end of the color mixing optical fiber, with the second end of the color mixing optical fiber having an area smaller than the area of the input end of the coupling fiber, the area of the input end of the coupling fiber extending beyond the area of the second end of the color mixing optical fiber may include a mirrored surface for reflecting light back into the coupling fiber.

At each junction/coupling between optical elements, care must be taken to match the etendue of the two elements. (The etendue of the element that the light is going into should be equal to or greater than the etendue of the element that the light is coming from). As a general rule, this can be accomplished by making the total incoupling area in the piece(s) that the light is going into equal to or larger than the total outcoupling area that the light came from, and making any area of the incoupling area extending beyond the outcoupling area reflective.

The apparatus may have a second light distributor rod and a second light coupling fiber operatively attached between the second face of the color mixing optical fiber and the second light distributor rod for coupling the white light from the color mixing optical fiber to the second light distributor rod. Alternatively, the apparatus may include a second light distributor rod and a second light coupling fiber operatively attached between the first and second light distributor rods for coupling the white light from the first light distributor rod to the second light distributor rod. Where the first and second coupling fibers each have an input end joined to the second end of the color mixing optical fiber, with input ends of the first and second coupling fibers having a combined area larger than the area of the second end of the color mixing optical fiber, the area of the fiber input ends of the first and second coupling fiber extending beyond the areas of the second end of the color mixing optical fiber may include a mirrored surface for reflecting light back into the first and second coupling fiber.

In another form of our invention, an apparatus for backlighting a liquid crystal display includes a light guide for backlighting the liquid crystal display, a light distribution rod attached to the light guide for distributing light into the light guide, and a color mixing optical fiber for mixing red green and blue light in the color mixing fiber to produce white light, the color mixing optical fiber having a first end adapted for receiving red green and blue light and a second end adapted for delivering the white light. The apparatus also includes means for directing red green and blue light into the first end of the color mixing optical fiber, and means for conducting the white light out of the second end of the color mixing fiber to the light distribution rod.

The means for conducting the white light out of the second end of the color mixing optical fiber to the light distribution rod includes means for attaching the second end of the color mixing fiber to the light distribution rod. The apparatus may include a light coupling fiber operatively attached between the second face of the color mixing optical fiber and the light distributor rod for coupling the white light from the color mixing optical fiber to the light distributor rod. The means for directing the red green and blue light from the red green and blue light sources to the first end of the of the color mixing fiber further may include means for generating the red green and blue light in individual light sources, and monochromatic light coupling fibers for coupling the light of the red green and blue light from the red green and blue light sources to the first end of the of the color mixing fiber as unmixed red green and blue light.

We contemplate that our invention may be practiced as a method, or embodied in an apparatus as disclosed herein.

The foregoing and other features and advantages of our invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

DETAILED DESCRIPTION OF THE PRESENTLY PREFERRED EMBODIMENTS

Figure 1:
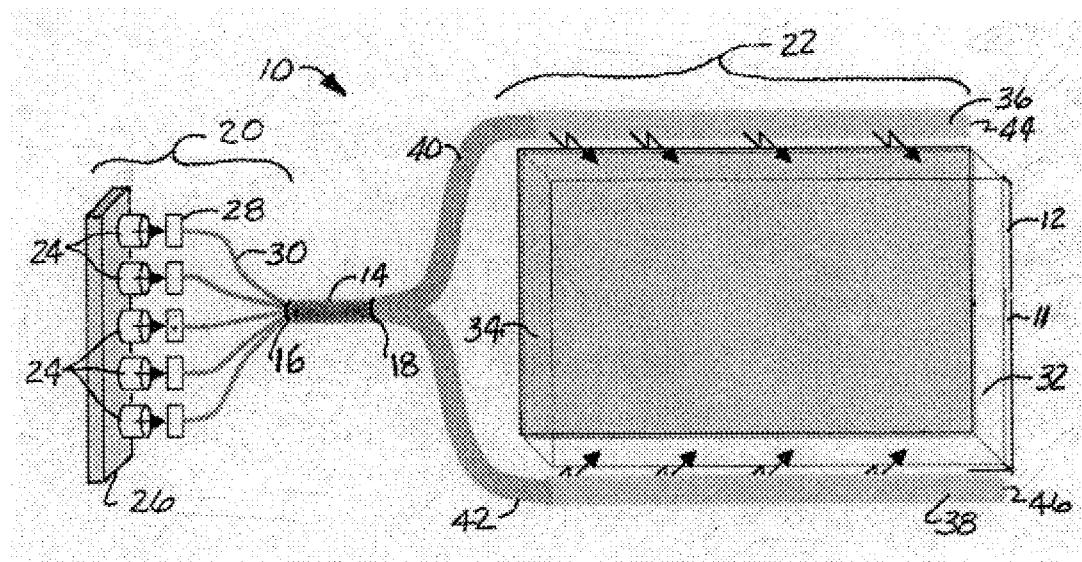
FIG. 1 is an illustration of a first embodiment of a white light backlighting system, according to our invention, having white light produced in a color mixing optical fiber conducted by a light coupling fiber to a light distributor rod.

FIG. 1 depicts a first exemplary embodiment of our invention in the form of an apparatus 10 for backlighting a liquid crystal display 12. As depicted in FIG.1, only the right edge 11 of the LCD is shown, with the remainder of the LCD hidden behind elements of the backlighting apparatus 10 described below. The backlighting apparatus 10 includes a color mixing optical fiber 14 for mixing red green and blue light in the color mixing fiber 14 to produce white light. The color mixing optical fiber 14 has a first end 16 adapted for receiving red green and blue light, and a second end 18 adapted for delivering the white light. The apparatus 10 also includes means for directing 20 red green and blue light into the first end 16 of the color mixing optical fiber 14, and means for conducting 22 the white light out of the second end 18 of the color mixing optical fiber 14 to the liquid crystal display 12.

The means for directing 20 the red green and blue light to the first end of the color mixing optical fiber 14 includes means, in the form of RGB LEDs 24 for generating the red green and blue light in individual light sources. The LEDs 24 are mounted on a heat sink 26 for removing heat generated by the LEDs 24. The means for directing 20 the red green and blue light to the first end 16 of the color mixing fiber 14 also includes means, in the form of in-coupling optics 28, and monochromatic light coupling fibers 30, for collecting and coupling the light generated by each of the individual red green and blue LED 24 light sources to the first end 16 of the color mixing fiber 14, as unmixed red green and blue light.

The number and type of LEDs 24 may be varied according to the needs of a given backlighting application. For example, it might be desirable to have a total of thirty RGB LEDS 24, (ten red; ten green, and ten blue), connected to a color mixing optical fiber 14 having a cross sectional diameter of about 8.0 mm by monochromatic light coupling fibers having a diameter of about 1.5 to 2.0 mm. For optimum efficiency of light transmission, it is contemplated that the monochromatic light coupling fibers 30 each have an output end oriented perpendicularly to the first end 16 of the color mixing optical fiber 14. In a preferred embodiment, the input ends are bonded directly to the first end 16 of the color mixing optical fiber 14 with an optical adhesive having an index of refraction matching the monochromatic and color mixing optical fibers 30, 14.

The input ends of the 1.5–2.0 mm diameter coupling fibers 30 have a combined area smaller than the area of the first end 16 of the color mixing optical fiber 14. The area of the first end 16 of the color mixing optical fiber 14 extending beyond the area occupied by the input ends 16 of the coupling fibers 30 is coated to provide a mirrored surface for reflecting light, that would otherwise escape around the input ends of the monochromatic light coupling fibers 30, back into the color mixing optical fiber 14. The length of the color mixing optical fiber 14 between the first and second ends 16, 18 may be varied to suit a given application and to achieve a desired degree of completeness of color mixing. For the 8.0 mm diameter fiber in the example described above, we contemplate that a length of about 10.0 cm should be sufficient to produce complete mixing of the RGB light into white light.

The means for conducting 22 white light out of the color mixing optical fiber 14 includes a light guide 32 for guiding the white light through the width and length of the liquid crystal display 12, and a reflector 34 for reflecting the white light out through the depth of the liquid crystal display 12. The means for conducting 22 white light out of the color mixing optical fiber 14 also includes a first and a second light distribution rod 36, 38, positioned along to the upper and lower edges respectively of the light guide 32 for distributing the white light into the liquid crystal display 12 via the light guide 32

In the embodiment depicted in FIG. 1, a first and a second light coupling fiber 40, 42 are used for coupling the white light from the second face 18 of the color mixing optical fiber 14 to the left ends, as depicted, of first and second light distribution rods 36, 38. For optimal efficiency it is contemplated that the coupling fibers. 40, 42 impinge perpendicularly on the second end 16 of the color mixing optical fiber 14 and the left ends of the light distribution rods 36, 38, and that the coupling fibers 40, 42 preferably be adhesively bonded to the second end 18 of the color mixing optical fiber 14 and to the left ends of the light distribution rods 36, 38, in the same manner described above for bonding the output ends of the monochromatic light coupling fibers 30 to the first end 16 of the color mixing optical fiber 14.

The area on the second end 18 of the input ends of the first and second light coupling fibers 40, 42 extending beyond the area occupied by the color mixing optical fiber 14 are coated to provide a mirrored surface for reflecting light back into the light coupling fibers 40, 42, to prevent leakage of light out of the second end 18 of the light coupling fibers 40, 42 around the input end of color mixing optical fiber 14. The distal (right ends as depicted) ends 44, 46 of the first and second light distribution rods 36, 38 respectively, and the area of the left ends of the light distribution rods 36, 38 extending beyond the area occupied by the first and second light coupling fibers 40, 42 are coated to provide a mirrored surface for reflecting light back into the light distribution rods 36, 38, to prevent leakage of light out of the distal ends 44, 46, and out of the left ends of the light distribution rods 36, 38 around the input ends of the first and second light coupling fibers 40, 42.

The outer circumferential surface of the color mixing optical fiber 14 is preferably left uncoated, but could be coated with a coating that is reflective, refractive, or opaque, depending upon the particular embodiment. The outer circumferential surfaces of the light distribution rods 36, 38 preferably have a light scattering material judiciously applied in a pattern resulting in uniform coupling of the light out of the distribution rods 36, 38 and into the light guide 32 along the length of the rods 36, 38. The cross section of the light distribution rod can also be varied (for example circular or square or rectangular) to optimize the coupling into the light guide.

Figure 2:
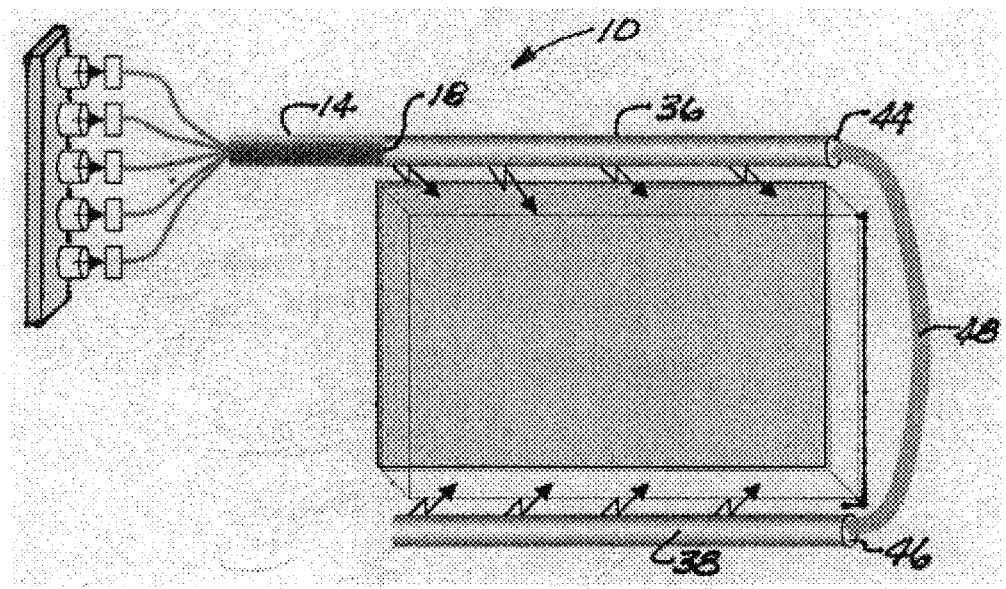
FIG. 2 is an illustration of a second embodiment of a white light backlighting system, according to our invention, having white light produced in a color mixing optical fiber conducted directly into a light distributor rod, without using a light coupling fiber, and then transmitted by a coupling fiber from the first distributor rod to a second distributor rod.

FIG. 2 depicts an alternate embodiment of our invention in which the second end 18 of the color mixing optical fiber 14 impinges directly upon the left end of the first light distribution rod 36, and the right ends, as depicted, of the light distribution rods 36, 38 are joined by a light coupling fiber 48. The various ends, surfaces, and junctures between the monochromatic light coupling fibers 30, the color mixing optical fiber 14, the light distribution rods 36, 38, and the light coupling fiber 48 are preferably treated as disclosed above in relation to the embodiment depicted in FIG. 1.

We contemplate that our invention may be practiced in many alternate forms of a backlighting apparatus, in addition to those disclosed above, and may also be practiced as a method for backlighting an LCD.

Although the forgoing description has utilized certain exemplary embodiments of our invention, many other changes and modifications can be made without departing from the spirit and scope of our invention. For example, the various optical fibers and components depicted and described as having a circular cross section could have virtually an unlimited range of other cross sections, such as square, rectangular, triangular, etc. The term LED as used herein is also contemplated to include individual RGB LEDs, or RGB multi-chip packages. Light distribution rods may be placed on only one, or on all sides of the light guide. The monochromatic light coupling fibers 30 may be eliminated and the light from the in-coupling optics be directly coupled to the first end of the color mixing optical fiber. Two independent means for directing red green and blue light onto separate color mixing optical fibers may be used, with the outputs coupled to separate light distribution rods, or the same light distribution rod on a single lightguide.

The scope of our invention is limited only by the appended claims, and all changes that come within the meaning and range of equivalents are intended to be embraced therein.

We claim:

1. A method for backlighting a liquid crystal display, the method comprising:
   providing a color mixing optical fiber having a first and a second end;
   directing red green and blue light into the first end of the color mixing optical fiber;
   mixing the red green and blue light in the color mixing fiber to produce white light, and,
   conducting the white light out of the second end of the color mixing fiber to the liquid crystal display.

2. The method of claim 1 further comprising generating the red green and blue light in individual light sources and directing the red green and blue light to the first end of the color mixing fiber.

3. The method of claim 2 further comprising collecting the light generated by each of the individual red green and blue light sources and directing the collected light to the first end of the color mixing fiber as unmixed red green and blue light.

4. The method of claim 1 further comprising guiding the white light through the liquid crystal display.

5. The method of claim 4 further comprising reflecting the white light out of the liquid crystal display.

6. The method of claim 4 further comprising distributing the white light into the liquid crystal display.

7. An apparatus for backlighting a liquid crystal display, the apparatus comprising:
- a color mixing optical fiber for mixing red green and blue light in the color mixing fiber to produce white light, the color mixing optical fiber having a first end adapted for receiving red green and blue light and a second end adapted for delivering the white light;
- means for directing red green and blue light into the first end of the color mixing optical fiber; and
- means for conducting the white light out of the second end of the color mixing fiber to the liquid crystal display.

8. The apparatus of claim 7 wherein the means for directing the red green and blue light to the first end of the color mixing fiber includes means for generating the red green and blue light in individual light sources.

9. The apparatus of claim 8 wherein the means for directing the red green and blue light to the first end of the color mixing fiber further includes means for collecting and coupling the light generated by each of the individual red green and blue light sources to the first end of the color mixing fiber as unmixed red green and blue light.

10. The apparatus of claim 8 wherein the means for collecting and coupling the red green and blue light from the red green and blue light sources to the first end of the color mixing fiber includes in-coupling optics.

11. The apparatus of claim 8 wherein the means for collecting and coupling the red green and blue light from the red green and blue light sources to the first end of the of the color mixing fiber includes monochromatic light coupling fibers for coupling the light of the red green and blue light from the red green and blue light sources to the first end of the of the color mixing fiber as unmixed red green and blue light.

12. The apparatus of claim 11 wherein the first end of the color mixing optical light fiber has an area, and the monochromatic light coupling fibers each have an output end joined to the first end of the color mixing optical fiber, with the output ends of the coupling fibers having a combined area larger than the area of the first end of the color mixing optical fiber, and the area of the output ends of the coupling fibers extending beyond the area of the first end of the color mixing optical fiber includes a mirrored surface for reflecting light back into the coupling fibers.

13. The apparatus of claim 7 further comprising a light guide for guiding the white light through the liquid crystal display.

14. The apparatus of claim 7 further comprising a reflector for reflecting the white light out of the liquid crystal display.

15. An apparatus for backlighting a liquid crystal display, the apparatus comprising:
- a color mixing optical fiber for mixing red green and blue light in the color mixing fiber to produce white light, the color mixing optical fiber having a first end adapted for receiving red green and blue light and a second end adapted for delivering the white light;
- means for directing red green and blue light into the first end of the color mixing optical fiber;
- means for conducting the white light out of the second end of the color mixing fiber to the liquid crystal display; and
- a light distributor rod for distributing the white light into the liquid crystal display.

16. The apparatus of claim 15 wherein the second end of the color mixing optical fiber is attached directly to the light distributor rod.

17. The apparatus of claim 15 further including a light coupling fiber operatively attached between the second face of the color mixing optical fiber and the light distributor rod for coupling the white light from the color mixing optical fiber to the light distributor rod.

18. The apparatus of claim 17 wherein the second end of the color mixing optical light fiber has an area, and the coupling fiber has an input end joined to the second end of the color mixing optical fiber, with the input end of the coupling fiber having an area larger than the area of the second end of the color mixing optical fiber, and the area of the input end of the coupling fiber extending beyond the area of the second end of the color mixing optical fiber includes a mirrored surface for reflecting light back into the coupling fiber.

19. The apparatus of claim 17 including a second light distributor rod and a second light coupling fiber operably attached between the second face of the color mixing optical fiber and the second light distributor rod for coupling the white light from the color mixing optical fiber to the second light distributor rod.

20. The apparatus of claim 17 including a second light distributor rod and a second light coupling fiber operatively attached between the first and second light distributor rods for coupling the white light from the first light distributor rod to the second light distributor rod.

21. The apparatus of claim 18 wherein the second end of the color mixing optical light fiber has an area, and the first and second coupling fibers each have an input end joined to the second end of the color mixing optical fiber, with input ends of the first and second coupling fibers having a combined area larger than the area of the second end of the color mixing optical fiber, and the area of the input ends of the first and second coupling fiber extending beyond the areas of the second end of the color mixing optical fiber includes a mirrored surface for reflecting light back into the coupling fibers.

22. An apparatus for backlighting a liquid crystal display, the apparatus comprising:
- a light guide for backlighting the liquid crystal display;
- a light distribution rod attached to the light guide for distributing light into the light guide;
- a color mixing optical fiber for mixing red green and blue light in the color mixing fiber to produce white light, the color mixing optical fiber having a first end adapted for receiving red green and blue light and a second end adapted for delivering the white light;
- means for directing red green and blue light into the first end of the color mixing optical fiber; and
- means for conducting the white light out of the second end of the color mixing fiber to the light distribution rod.

23. The apparatus of claim 22 wherein the means for conducting the white light out of the second end of the color mixing fiber to the light distribution rod includes means for coupling the second end of the color mixing fiber to the light distribution rod.

24. The apparatus of claim 22 further including a light coupling fiber operatively attached between the second face of the color mixing optical fiber and the light distributor rod for coupling the white light from the color mixing optical fiber to the light distributor rod.

25. The apparatus of claim 22 wherein the means for directing the red green and blue light from the red green and blue light sources to the first end of the color mixing fiber further includes means for generating the red green and blue light in individual light sources, and monochromatic light coupling fibers for coupling the light of the red green and blue light from the red green and blue light sources to the first end of the of the color mixing fiber as unmixed red green and blue light.

* * * * *